2,871,144

METHOD FOR THE PREPARATION OF CEMENTABLE FLUOROCARBON POLYMER SURFACES

Robert Charles Doban, Wilmington, Del., assignor to E. I. du Pont de Nemours and Company, Wilmington, Del., a corporation of Delaware No Drawing. Application April 3, 1957
Serial No. 650,297

7 Claims. (Cl. 117—138.8)

The present invention relates to a novel method of coating fluorinated polymers and particularly to a method for making surfaces of fluorinated polymers cementable.

Polymers of fluorinated olefins, such as polytetrafluoroethylene, polychlorotrifluoroethylene and copolymers of tetrafluoroethylene with fluorinated olefins, are highly useful dielectric materials which find wide applications in the electric and electronic industry. In addition to their electrical properties the fluorinated polymers show outstanding corrosion resistance to many chemicals. Another property of the fluorinated polymers and particularly polytetrafluoroethylene, is the extremely low adhesion of the polymer surface to other materials. This property is a disadvantage in the preparation of articles requiring the bonding of the polymer surface to itself or to other surfaces. Adhesives generally used in cementing polymers do not give satisfactory results when employed with fluoroolefin polymers. The cementing of fluoroolefin polymers to itself and other surfaces is highly desirable in the lining of pipes and vessels used in the storage and transportation of corrosive chemicals, since the corrosion resistant polymers can then be combined with less expensive structural materials. Another large application for cementable fluoroolefin polymers is in the manufacture of pressure-sensitive insulation tapes.

It is therefore the objective of the present invention to provide a method for making surfaces of fluoroolefin polymers cementable.

It has been discovered in accordance with the present invention that a cementable fluoroolefin polymer surface is obtained when said surface is treated with a solution of an alkali metal addition compound, and preferably a sodium addition compound. As a result of the treatment the surface of the polymer treated assumes a dark color, and becomes adherent to adhesives generally used in cementing of such materials as metal, wood, plastics, ceramics, etc. The exact chemical structure of the resulting dark colored coating obtained by the above described treatment has not been definitely identified, but it is known that the treated surface contains no metal, does not conduct electricity and that the coating is intimately combined with the polymer.

The alkali metal addition compounds employed in the present invention are reaction products obtained by the reaction of aromatic hydrocarbons with finely divided dispersions of alkali metals. Suitable aromatic hydrocarbons are such compounds as naphthalene, anthracene and biphenyl. The preparation of addition compounds and their characterization has been disclosed in the literature in such sources as: (1) N. D. Scott, J. F. Walker and V. L. Hansley, JACS, 58, 2442 (1936); (2) J. F. Walker and N. D. Scott, JACS, 60, 951 (1938); (3) D. E. Paul, D. Lipkin and S. I. Weissman, JACS, 78, 116 (1956); (4) S. C. Yu and T. L. Chu, JACS, 76, 3367 (1954). The alkali metal addition compounds can be prepared in and are generally soluble in specific ethers and tertiary amines such as dimethyl ether, tetrahydrofurane, 1,2-dimethoxyethane, dioxane and related ethers as disclosed in U. S. Patents 2,019,832, 2,023,793, 2,027,000, 2,054,303, 2,119,493 and 2,125,401. The The alkali metals suitable for the preparation of addition compounds are sodium, lithium, potassium, cesium and rubidium. Because of its ready commercial availability, sodium is in general preferred.

The cementable surface of the fluoroolefin polymer is obtained by contacting the surface of the polymer with a solution of the alkali metal addition compound. It is essential that the surface of the polymer be wetted by the solvent employed for the addition compound. Since, however, organic solvents in general will wet surfaces of fluoroolefin polymers, the choice of the solvent will be primarily determined by the reaction medium in which the addition compounds are formed rather than the fluoroolefin polymer. The concentration of the addition compound in the solvent and the contact time may be greatly varied. The lower the concentration, the longer the contact time required to obtain the dark colored cementable surface. In general a 1% solution of the addition compound is highly satisfactory, requiring contact times of less than one minute. Since the addition compounds decompose on contact with moisture, the treatment is preferably carried out in a dry, inert atmosphere, unless a more concentrated solution is employed.

The fluoroolefin polymers suitable for the process of the present invention are polymers obtained from fluorinated ethylene and copolymers of fluorinated ethylene with ethylenically unsaturated monomer. Examples of such polymers and copolymers are polytetrafluoroethylene, polychlorotrifluoroethylene, polyvinylidenefluoride and copolymers of tetrafluoroethylene and hexafluoropropylene and similar monomers. In general, the cementability of the treated surface increases with the fluorine content of the polymer, thus perfluoroolefin polymers in which substantially all of the free valences of the carbon chain are satisfied by fluorine, such as polytetrafluoroethylene, will give the most adhesive surface. Good results are generally obtained with polymers in which at least 50% of the carbon bonds other than carbon-to-carbon bonds are carbon-to-fluorine bonds.

The invention is further illustrated by the following examples:

EXAMPLE I

A 300 ml. three-necked flask fitted with a condenser, thermometer, high speed stirrer, soft rubber stopper and connected through the condenser to a mercury bubbler and a nitrogen manifold was dried thoroughly by baking for one hour in a circulating air oven at 100° C. and cooled in a stream of dry nitrogen. To the flask was added 100 ml. of dry toluene and 2 g. of metallic sodium (0.089 mole). The contents were heated to 100° C. under nitrogen and the sodium dispersed into fine particles by stirring at 10,000 R. P. M. After 5 minutes, stirring was stopped and the finely dispersed sodium allowed to settle and cool to room temperature. Most of the toluene was removed through a hypodermic needle and replaced with 200 ml. of dry tetrahydrofurane. With slow stirring, there was added 11.14 g. of sublimed naphthalene (0.087 mole). After stirring for one hour at room temperature, the intense blue-green solution was removed through a hypodermic needle and stored in a bottle which had been flushed thoroughly with dry nitrogen and which was fitted with a soft rubber cap.

Fifteen samples of a copolymer of tetrafluoroethylene and hexafluoropropylene, 1″ x 3″ x 0.005″, were cleaned with acetone and dried at 100° C. for 30 minutes in a circulating air oven. These samples were placed in a large test tube fitted at the top and bottom with soft rubber caps and allowed to cool in a stream of dry nitrogen. When cool, the tube containing the samples was filled rapidly through a hypodermic needle with a 50 ml. portion of the solution of the sodium naphthalene addition compound. After 30 seconds the solution was withdrawn and 50 ml. of methanol injected rapidly. The characteristic blue-green color of the sodium naphthalene reagent, traces of which adhered to the polymer, disappeared instantly on contact with the methanol. After 5 minutes the polymer strips were washed with acetone and dried in air. The samples treated in this way were light brown in color.

The treated strips of polymer were coated with an epoxy cement (bonding agent 313, Carl H. Biggs Corp.) and cemented to strips of steel, copper and to themselves. The bonds were cured by heating for 25 minutes at 100–110° C. at a pressure of 60 p. s. i. In all instances a continuous bond was obtained.

The experiment was repeated with the sodium anthracene reagent prepared from 2 g. of sodium and 12.7 g. of anthracene as described above.

The experiment was again repeated with the sodium biphenyl addition compound prepared from 2 g. of sodium and 13.4 g. of biphenyl in 200 ml. of 1,2-dimethoxyethane as described above.

The following peel strengths were measured on these various samples using a crosshead speed of 2" per minute:

*Bond strength, lb./in. width*

| Reagent | Resin-to-Resin | Resin-to-Steel | Resin-to-Copper |
|---|---|---|---|
| Sodium Naphthalene | 2.9 | 11.2 | 10.8 |
| Sodium Anthracene | 3.9 | 11.0 | 9.3 |
| Sodium Biphenyl | 4.9 | 10.0 | 10.0 |
| None | 0 | 0 | 0 |

EXAMPLE II

The experiment described in Example I was repeated with polytetrafluoroethylene. In addition to steel and copper, the treated strips were bonded to aluminum.

The following peel strengths were measured on various samples of treated polytetrafluoroethylene using a crosshead speed of 2" per minute:

*Bond strength, lb./in. width*

| Reagent | Resin-to-Resin | Resin-to-Steel | Resin-to-Copper | Resin-to-Aluminum |
|---|---|---|---|---|
| Sodium Naphthalene | 3.0 | 6.3 | 6.3 | 3.4 |
| Sodium Anthracene | 3.5 | 6.4 | 5.9 | 3.4 |
| Sodium Biphenyl | 6.3 | 8.5 | 7.1 | 3.4 |
| None | 0 | 0 | 0 | 0 |

Similar results are obtained with other adhesives such as polyester or cellulosic cements and other fluoroolefin polymers such as polychlorotrifluoroethylene. Various methods of applying the solution of the alkali metal addition compound will occur to those skilled in the art.

The treated surface obtained by the process of the present invention may be used in a large number of applications in addition to cementing. Thus the process of the present invention is suitable for the preparation of printed circuits. Treated surfaces are readily vacuum metallized to conduct electricity and metal adheres well to the treated surface even without a bonding agent. Printing inks and paints may be suitably applied to treated surfaces. If desired, the treating solution itself may be employed as an ink to write on fluorinated polymer surfaces.

Thus a wide variety of applications is served by the process of the present invention.

I claim:

1. A process for treating a perfluoroolefin polymer to obtain a cementable surface, which comprises contacting said perfluoroolefin polymer surface with a tetrahydrofurane solution of an alkali metal addition compound, said compound being obtained by the reaction of an alkali metal with an aromatic hydrocarbon, and thereafter treating the said surface with methanol.

2. The process as set forth in claim 1 wherein the perfluoroolefin polymer is polytetrafluoroethylene.

3. The process as set forth in claim 1 wherein the perfluoroolefin polymer is a copolymer of tetrafluoroethylene and hexafluoropropylene.

4. The process of treating a perfluoroolefin polymer to obtain a cementable surface, which comprises contacting said perfluoroolefin polymer surface with a tetrahydrofurane solution of a sodium addition compound, said compound being obtained by the reaction of metallic sodium with an aromatic hydrocarbon, and thereafter treating the said surface with methanol.

5. The process as set forth in claim 4 wherein the sodium addition compound is sodium biphenyl.

6. The process as set forth in claim 4 wherein the sodium addition compound is sodium naphthalene.

7. The process as set forth in claim 4 wherein the sodium addition compound is sodium anthracene.

References Cited in the file of this patent

UNITED STATES PATENTS

| 2,027,000 | Scott | Jan. 7, 1936 |
| 2,789,063 | Purvis et al. | Apr. 16, 1957 |